United States Patent Office 3,155,635
Patented Nov. 3, 1964

3,155,635
PROCESSES FOR MOLECULAR WEIGHT CONTROL
OF POLYCARBONATES
Rudolph D. Deanin, West Hartford Township, Hartford
County, Conn., and Ann V. Pinter, Morristown, N.J.,
assignors to Allied Chemical Corporation, New York,
N.Y., a corporation of New York
No Drawing. Filed Feb. 15, 1961, Ser. No. 89,364
5 Claims. (Cl. 260—47)

This invention relates to the production of polycarbonates by reaction of bisphenols with phosgene. The invention is more particularly directed to having present in the reaction mixtures in which the polycarbonates are thus formed and grow in molecular weight, a saturated aliphatic, monohydric alcohol which serves to control the molecular weight of the polycarbonate product.

It is known to prepare polycarbonates by introducing phosgene into a mixture of a bisphenol or halogen derivative of a bisphenol, aqueous caustic alkali solution and an organic solvent for phosgene which is also a solvent for the polycarbonate and is immiscible with or only slightly soluble in the caustic alkali solution. It is customary to agitate the reaction mixture for a period of time after it has been phosgenated to obtain growth in molecular weight of the polycarbonate product. Small amounts of a catalyst promoting the formation and growth of the polycarbonates and of a chain terminating agent capable of reacting with active terminal groups of the polycarbonate to control its growth in molecular weight may be and commonly are present in the phosgenated reaction mixture. In such a process the caustic alkali is an acid acceptor, in that the chlorine of the phosgene which reacts with the bisphenol appears in the reaction product combined with the sodium of the caustic alkali rather than as hydrogen chloride. This type of process in which the reaction mixture is in the form of a dispersion or intimate mixture of an aqueous solution, in which the unreacted bisphenol is presumably present in the form of its alkali metal salt, and an organic phase in which the phosgene is soluble and the polycarbonate formed is also soluble and ultimately appears in the form of a solution or gel of the polycarbonate and organic solvent, is commonly designated as an emulsion procedure for the preparation of the polycarbonates.

In a second type of procedure for preparing those bisphenol polycarbonates, known as a solution procedure, the formation and growth in molecular weight of the polycarbonates take place in solutions of the reactants in organic bases or in mixed solvents including organic bases. In these procedures the organic bases serve as an acid acceptor and may also serve as solvent for the reactants and the polycarbonate product and as a catalyst promoting the formation and growth of the polycarbonate.

We have now discovered that in those known processes for the production of polycarbonates of the bisphenols, the presence in the reaction mixture in which the phosgene is absorbed, of a saturated aliphatic, monohydric alcohol acts as an effective control of the molecular weight of the polycarbonate product even though it would not be expected to act in the manner the phenols heretofore used act as chain terminators for the polycarbonates.

Depending upon reaction conditions employed, those alcohols can be used to promote or to limit the growth in molecular weight of the polycarbonate to obtain higher or lower molecular weight products than are obtained by the same procedure in the absence of the alcohol. In general, with low amounts of the alcohol and low concentrations of catalyst active to promote growth in molecular weight present, the alcohols induce growth to higher molecular weights of the polycarbonates formed than when no alcohol is present. With increased amounts of the alcohol the molecular weights of the polycarbonates can be limited to less than those produced in the absence of the alcohol. Even with higher amounts of active catalyst promoting growth in molecular weight of the polycarbonate, small amounts of the alcohol as compared with the bisphenol are effective to limit the molecular weights obtained to below those obtained in the absence of the alcohol. For a given procedure and operating conditions the amount of alcohol to be used to obtain a given molecular weight of polycarbonate can be empirically determined. Once this is determined, by maintaining uniform conditions the presence of the monohydric alcohol in the phosgenated reaction mixture will effectively serve to control the molecular weight of the product and the products of the desired molecular weight can be produced readily and consistently.

In operating in accordance with our invention the prior art emulsion or solution procedures can be employed for reacting phosgene and a bisphenol in the presence of an acid acceptor and organic solvent for the phosgene and polycarbonate. Our invention is characterized by the addition to the reaction mixture into which the phosgene is introduced of a saturated aliphatic, monohydric alcohol in a small amount by weight of the bisphenol which is effective to control the growth in molecular weight of the polycarbonate product and to produce a polycarbonate having a different molecular weight from that produced by the same process in the absence of the alcohol. Any of the primary, secondary or tertiary, saturated aliphatic, monohydric alcohols can thus be employed to control the molecular weight of the polycarbonate products. In our preferred procedures. however, we employ a primary, saturated aliphatic, monohydric alcohol containing 1 to 9 carbon atoms, an alcohol of the homologous series methanol through nonanol, amounting to about 0.1% to about 10% by weight of the bisphenol.

The use of the saturated aliphatic, monohydric alcohols in accordance with our invention, to control the molecular weight of the polycarbonates produced by reaction of phosgene and bisphenols, is equally applicable to the foregoing emulsion or solution procedures by which it is known to produce polycarbonates of the bisphenols having the structure

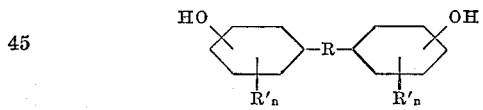

in which R is a divalent alkane or saturated alicyclic radical or a divalent aryl or aralkyl radical containing only aromatic unsaturation, R' is a monovalent alkane radical and $n$ is an integer from 0 to 4, and the derivatives of those bisphenols which contain halogen attached to carbon in an aromatic ring. The bisphenols having the above structure in which each of the two hydroxyl groups is in the 4-position of a phenylene radical and are linked through phenylene radicals, each pair of which is linked through a single carbon atom of a divalent alkane radical, are the preferred bisphenols for production of polycarbonates in accordance with our invention.

Examples of those bisphenols from which their polycarbonates can be prepared in the foregoing manners and the molecular weights of the polycarbonates can be controlled by the presence of a saturated aliphatic, monohydric alcohol in accordance with our invention, are:

2,2-bis(4-hydroxyphenyl) propane (commonly known as bisphenol-A),
Bis(4-hydroxyphenyl) methane,
1,1-bis(4-hydroxyphenyl) cyclohexane,
1,1-bis(4-hydroxy-3-methylphenyl) cyclohexane,
2,2-bis(2-hydroxy-4-tert-butylphenyl) propane,
3,4-bis(4-hydroxyphenyl) hexane, 1,1-bis(4-hydroxyphenyl)-1-phenyl ethane,
2,2-bis(4-hydroxyphenyl) butane,
2,2-bis(4-hydroxyphenyl) pentane,
3,3-bis(4-hydroxyphenyl) pentane,
2,2-bis(4-hydroxyphenyl)-3-methyl butane,
2,2-bis(4-hydroxyphenyl) hexane,
2,2-bis(4-hydroxyphenyl)-4-methyl pentane,
2,2-bis(4-hydroxyphenyl) heptane,
4,4-bis(4-hydroxyphenyl) heptane, and
2,2-bis(4-hydroxyphenyl) tridecane, as well as the halogen derivatives of those bisphenols, 2,2-bis(4-hydroxy-3-chlorophenyl) propane and
2,2-bis(4-hydroxy-3,5-dibromophenyl) propane.

Our invention is more particularly described and illustrated in the following examples. The molecular weights given are those calculated from the effluent times of an 0.1% solution of the polycarbonate in ethylene chloride and of the ethylene chloride solvent measured in an Ostwald-Fenske viscometer at 25° C., using the following equations:

$$N_r = \frac{\frac{T}{T'} - 1}{C}$$

$$N_i = N_r - 0.02$$

$$M.W.^{0.83} = \frac{N_i}{1.23 \times 10^{-4}}$$

In these equations T and T' are the effluent times of the solution of the polycarbonate and of the solvent, respectively, C is the concentration of the polycarbonate in the solution in grams/100 cc. of solvent, and M.W. is the molecular weight of the polycarbonate. Plotting the values for M.W. (as ordinates) at various values for $N_i$ (as abscissas) on common log-log graph paper gives a straight line, which was used to read directly the molecular weight.

*Examples 1-3.*—A reaction vessel fitted with a stirrer, reflux condenser, thermometer and gas inlet dip tube, was charged with 500 cc. water, 31.5 gm. of caustic soda analyzing 95% NaOH, and 57 gm. of bisphenol-A, with a stream of nitrogen gas being passed into and through the reaction vessel. The mixture was stirred until the caustic soda and bisphenol-A were dissolved in the water. The resulting warm aqueous solution was cooled to room temperature and 500 cc. methylene chloride or ethylene chloride was introduced, followed by 6.4 cc. of a 10% solution in water of benzyl triethyl ammonium chloride. This corresponded to 1.08 mol percent of the benzyl triethyl ammonium chloride catalyst by weight of the bisphenol-A. Small amounts of methanol were also introduced into mixtures thus prepared.

The flow of nitrogen gas was discontinued and 27.5 gm. phosgene gas was bubbled into the material in the vessel at a substantially uniform rate over a period of one hour, with the two liquid phases in the vessel being stirred to keep them intimately mixed, and cooled to maintain their temperature at about 30° C. The reaction mixture was continued to be stirred for a further post phosgenation period at 30° C. for growth of the molecular weight of the polycarbonate present in solution in the methylene chloride or ethylene chloride solvent.

The resulting solution of polymer in the solvent was separated from the aqueous phase present and was washed wtih a dilute solution of hydrochloric acid in water and finally with water to remove the acid. Dropwise addition with stirring of 400 cc. acetone followed by 500 cc. of methanol precipitated the polycarbonate from its solution. The precipitate was filtered off and dried at 120° C.

Following Table 1 shows the solvent present, the duration in minutes of the post phosgenation period of stirring the reaction mixture, the amount of methanol added in wt. percent of the bisphenol-A charged and the resulting molecular weights of the polycarbonate products produced.

*Table 1*

| Ex. | Solvent | Post Phosgenation, mins. | Wt. Percent Methanol | Molecular Weight |
|---|---|---|---|---|
| 1 | Methylene Chloride | 60 | 0.11 | 55,000 |
| 2 | do | 60 | 1.12 | 26,000 |
| 3 | Ethylene Chloride | 25 | 0.39 | 108,000 |
|   | do | 25 | 0 | 50,000 |

*Examples 4-6.*—In these examples the procedure and reaction mixture was the same as in Example 3 above except that the amount of benzyl triethyl ammonium chloride catalyst was doubled (12.7 cc. of the 10% solution of this catalyst in water being added to the reaction mixture), the post phosgenation period was 15 minutes, and varied amounts of primary nonanol were substituted for the methanol. With no alcohol added the molecular weight of the polycarbonate product was 100,000. As shown in the following Table 2 the addition of from 1.12% to 2.79% of the nonyl alcohol by weight of the bisphenol-A resulted in decreasing molecular weights of the polycarbonate product below the molecular weight obtained when no alcohol was added.

*Table 2*

| Ex. | Wt. Percent Nonanol | Molecular Weight |
|---|---|---|
| 4 | 1.12 | 66,000 |
| 5 | 1.89 | 34,000 |
| 6 | 2.79 | 16,000 |

*Example 7.*—The same apparatus as employed in the preceding examples was employed in this example, charging to the reaction vessel 500 cc. methylene chloride, 79 gm. pyridine, 57 gm. bisphenol-A and 0.64 gm. methanol (1.12% by weight of the bisphenol-A), with nitrogen gas being passed through the vessel. This mixture was stirred to dissolve the bisphenol-A in the mixture of methylene chloride and pyridine. The solution was then cooled and maintained at about 0° C. while 35 gm. phosgene gas was bubbled into it over a period of two hours. The solution was then warmed to 30° C. and stirred at that temperature for one hour.

The resulting solution was washed twice with a 3% HCl solution in water and then was washed with water until neutral. Polycarbonate of bisphenol-A was precipitated from the solution by addition of 288 cc. acetone followed by 500 cc. methanol. The precipitated polycarbonate was filtered off and dried in air at 120° C. The polycarbonate thus produced had a molecular weight of 9,300.

In an identical procedure except for no addition of methanol, the polycarbonate product had a molecular weight of 20,500.

We claim:
1. In a process for the production of a polycarbonate of a bisphenol which is a member of the group consisting of bisphenols having the structure

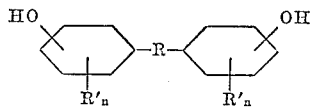

in which R is a divalent radical from the group consisting of the alkane, saturated alicyclic and aryl radicals and the aralkyl radicals containing only aromatic unsaturation, R' is a monovalent alkane radical and $n$ is an integer from 0 to 4, and halogen derivatives of those bisphenols in which the halogen is attached to carbon in an aromatic ring, in which process phosgene and said bisphenol are reacted in the presence of an acid acceptor and organic solvent for the phosgene in which the polycarbonate is soluble, that improvement which comprises carrying out the phosgenation reaction in the presence of a saturated aliphatic, monohydric alcohol in small amount by weight of said bisphenol which is effective to control the growth in molecular weight of the polycarbonate and to produce a polycarbonate having a different molecular weight from that produced by the same process in the absence of the alcohol.

2. The process of claim 1 in which the alcohol is a primary, saturated aliphatic, monohydric alcohol containing 1 to 9 carbon atoms.

3. The process of claim 2 in which the alcohol amounts to about 0.1% to about 10% by weight of the bisphenol.

4. The process of claim 2 in which the bisphenol is 2,2-bis(4-hydroxyphenyl) propane.

5. The process of claim 3 in which the bisphenol is 2,2-bis(4-hydroxyphenyl) propane.

References Cited in the file of this patent

UNITED STATES PATENTS

| | | |
|---|---|---|
| 2,500,222 | Weaver et al. | Mar. 14, 1950 |
| 2,964,794 | Peilstöcker et al. | Dec. 20, 1960 |
| 2,970,131 | Moyer et al. | Jan. 31, 1961 |
| 2,991,273 | Hechelhammer et al. | July 4, 1961 |
| 3,028,365 | Schnell et al. | Apr. 3, 1962 |

OTHER REFERENCES

Wagner et al.: "Synthetic Organic Chemistry," John Wiley & Sons, Inc., New York, New York, 1953 (pages 483–484 relied on).